(12) United States Patent
Singhal (10) Patent No.: US 8,363,834 B1
(45) Date of Patent: Jan. 29, 2013

(54) SYSTEMS AND METHODS FOR COMPLEX ENCRYPTION KEYS

(76) Inventor: Tara Chand Singhal, Torrance, CA (US)

( * ) Notice: Subject to any disclaimer, the term of this patent is extended or adjusted under 35 U.S.C. 154(b) by 788 days.

(21) Appl. No.: 12/229,447

(22) Filed: Aug. 22, 2008

Related U.S. Application Data (60) Provisional application No. 61/135,599, filed on Jul. 22, 2008.

(51) Int. Cl.
- H04L 9/22 (2006.01)
- H04L 9/26 (2006.01)
- G06F 7/58 (2006.01)
- H04L 9/08 (2006.01)

(52) U.S. Cl. .......................... 380/46; 380/270
(58) Field of Classification Search .............. 380/46, 380/270
See application file for complete search history.

(56) References Cited

U.S. PATENT DOCUMENTS

| 7,313,237 | B2 * | 12/2007 | Bahl et al. ................ 380/44 |
| 7,688,976 | B2 | 3/2010 | Singhal |
| 2003/0039355 | A1 * | 2/2003 | McCanny et al. .......... 380/37 |
| 2008/0049938 | A1 * | 2/2008 | Singhal .................. 380/277 |
| 2011/0268275 | A1 | 11/2011 | Singhal |

OTHER PUBLICATIONS

Foldoc. "XOR" (definition), Dec. 2006.*
Ramakrishnan, K.; Balasubramanian, A.; Mishra, S.; Sridhar, R., "Wireless security protocol using a low cost pseudo random number generator," . . . Military Communications Conference, 2005. MILCOM 2005. IEEE , vol., No., pp. 1333-1339 vol. 3, Oct. 17-20, 2005.

* cited by examiner

*Primary Examiner* — Michael Simitoski
(74) *Attorney, Agent, or Firm* — Steve Roeder, Esq.

(57) ABSTRACT

Complex encryption keys, in an encryption scheme using an encryption algorithm and an n-bit length encryption key that does not depend upon using longer keys, has the steps: (i) parsing the n-length key into a set of numbers, (ii) mapping each set of numbers to a wave, and (iii) combining the set of waves additively yielding a complex wave, where a sequence of random numbers, called wave random numbers from the wave amplitude may be derived. The wave random numbers are then used for generating different types of complex encryption keys, such as random transient keys (RTK), random helical keys (RGH) and random length keys (RLK). These complex keys are transient encryption keys and are deleted after each use and recreated at a different time and place for decryption by repeating the process steps.

20 Claims, 7 Drawing Sheets

- Parse key into wave parameters
- Map to wave parameters to wave
- Combine waves
- Read random numbers
- Create a variable length key (RLK) from the random number
- Read a data block equal in size to the RLK
- Use the RLK key sequence for encryption
- Delete the RLK
- Repeat 4 to 8 for subsequent data blocks

58

SYSTEMS AND METHODS FOR COMPLEX ENCRYPTION KEYS

CROSS REFERENCE TO RELATED APPLICATIONS

This application claims priority on U.S. Provisional Application Ser. No. 61/135,599, titled "SYSTEMS AND METHODS FOR STRONG ENCRYPTION KEYS" filed on Jul. 22, 2008, by Tara Chand Singhal. The contents of the Provisional Application Ser. No. 61/135,599 are incorporated herein by reference.

This application is related to the United States Patent Application 2008/0049938, Singhal; Tara Chand, publication date: Feb. 28, 2008, Systems and methods of ambiguity envelope encryption scheme and applications.

FIELD OF THE INVENTION

The preferred embodiment is on systems and methods for turning ordinary encryption keys into complex encryption keys using a new approach to generating random numbers, called wave random numbers.

BACKGROUND

Protecting data in transit requires encrypting the data on one end of the transmission and then decrypting it at the other end of the transmission. Protecting data in storage requires encrypting the data before storage and then decrypting it after retrieval from storage. The encryption, also know as cryptology, is based on having an encryption algorithm and an encryption key. The encryption algorithms are generally few and known at large. Therefore, protecting data depends largely upon protecting the encryption key itself.

As the computers processor speeds have increased, it has become easier to break these encryption keys by brute force. Hence longer and longer keys are being proposed for use and used. While in the past, 64 and 128 bits were used, the key lengths that are common used today are 256 bits, 384 bits, and 512 bits, the later two in high security applications. As an example, the Advanced Encryption Standard (AES) uses three keys in sequence to create the effect of a longer key, for example three keys each of 64 bits may be used in sequence rather than one key of 192 bits.

It is said that using longer keys for security provides a temporary advantage, as the speed of computers would keep increasing and the time it takes to break even longer keys would come down. Using computers in parallel also provides great computing strength that may be used to break longer keys.

Further, a key, that is used repeatedly, has the potential of being broken in other ways by analyzing the encrypted data and the unencrypted data using that key. To overcome this issue, a set of keys, instead of a single key may be stored at each end and an information exchange protocol is then used to select and/or negotiate use of one of these keys for a given session, before the session. In addition to that, each key that is selected for use is made different by various ways. One of which is Xor'ing an harmonically increasing block number to each key, the other is chaining the key to the previous data block. These are deterministic as opposed to random techniques and may be worked around to break the key.

The third issue in encryption and encryption key use is initially generating and then periodically refreshing or regenerating the keys. This requires a great effort, as it requires secure storage and secure distribution to the point of use. The keys are originally created using a random selection of digits that comprise the key. That in itself is a time consuming and difficult process to make sure the key is truly random and is not subject to different forms of attack.

It is the objective of the preferred embodiment to transform encryption keys into stronger keys that may not be broken by brute force. It is also the objective, to increase encryption strength for wireless transmission, internet and data storage security by using stronger keys that are not dependent on using longer encryption keys. It is also the objective of the preferred embodiment to lessen the need for extraordinary effort required in safeguarding keys.

SUMMARY

The preferred embodiment teaches creating and using complex encryption keys. In prior art encryption, the security is achieved by using a complex algorithm and an encryption key of a fixed length. In prior art, also the encryption key is usually XOR'ed with a sequence of block numbers to make it difficult to break. In this preferred embodiment, the security is achieved using the prior art encryption algorithms but a complex encryption key. The complex encryption key is derived from the prior art encryption key using wave random numbers as described later.

The complex key is derived from the prior art key for onetime use at the time of actual use and then permanently discarded. The technology of wave random numbers enables these onetime use keys to be recreated at the actual time of decryption use for onetime use and then permanently discarded.

The complexity of the encryption key of the preferred embodiment is achieved by using wave random numbers, where these wave random numbers have been derived from a complex wave and where these wave random properties are used in different ways to create and use complex keys of the preferred embodiment.

US application 20080049938, Singhal; Tara Chand, publication date: Feb. 28, 2008, Systems and Methods of Ambiguity Envelope Encryption Scheme and Applications, of the author described using random numbers that relies on a new scheme of generating random numbers from the envelope of a wave. The envelope has been called Ambiguity Envelope (AE), in the above referenced US application. The AE required a beginning set of prior art generated random numbers, which are then mapped to waves, the waves are additively combined to yield an envelope, and the amplitudes or offset from the envelope for the time sequence is used to yield a sequence of random numbers. This sequence of random numbers from the amplitude of the ambiguity envelope was then applied to the prior art encryption key to generate transient, onetime use random keys, that were immediately discarded after such one time-use, without the need to save or secure them.

The preferred embodiment herein teaches the use of an encryption key itself for generating the set of random numbers for generating the waves, without the need to require additional inputs of such as random numbers, as above. Thus the preferred embodiment works within the cryptology science, without requiring additional inputs such as random numbers.

In the preferred embodiment, these random numbers that are derived from the encryption key itself, are then mapped to waves, these waves are then additively combined into a complex wave. The complex wave is then used to derive multiple random properties. One of these random properties is a sequence of random numbers. These random numbers derived from the complex wave are given the name Wave Random Numbers (WRN), for ease of reference in this application.

The WRN are then used to randomly vary the prior art encryption key to derive onetime use random transient encryption keys. Therefore, the preferred embodiment teaches generating a new class of keys, called random transient keys (RTK), that are derived by an operation between the WRN and the prior art key, and RTK are then used in place of the prior art key.

The second random property from the complex wave is the odd/even property of the wave random numbers themselves. This random property is used to create a random helical overlay of the prior art key and the RTK to create randomly ordered set of two keys, one the prior art key and the second the RTK. This set of key is given the name random helical key (RHK) for ease of reference. Hence, the RHK is based on using a series of double keys, where the order of which key is used first is selected randomly.

These RTK and the RHK, transient, onetime-use, sequence of keys, are only generated from the prior art static key itself. Thus the use of the RTK as a complex key provides for a stronger key than the prior art encryption key, as the RTK is a product of a prior art random fixed key and a wave random number sequence.

The use of RHK provides for an even stronger encryption key than even the RTK, as the RHK provides for a set of two keys, that are in sequence randomly selected between the prior art fixed key and the RTK. These RHK keys are much stronger than the standard prior art encryption key itself, as one of the RHK key is a random variant of the prior art key. Alternatively, for the RHK, the set of two RHK keys, instead, may be used as one key by concatenating these two keys, the prior art key and the RTK in a random order. Thus if the prior art key was 128 bits in length, the RHK would be a set of two keys, each 128 bit long or alternatively a single key of 256 bit length.

Another way to use wave random number property is in generating a sequence of variable length keys. This embodiment of complex encryption key is called, random length key (RLK). As a simplified illustration, if the prior art key is 128 bit long, the length of the RLK key may be 128 bit or 256 bit, where the length would vary randomly using the wave random number random properties. The benefit of variable length key is that the length of key varies from each block in a random manner. Thus making it difficult in determining what the data boundaries are for those who would attempt to break the key.

Further, while the prior art keys need to be stored and safeguarded as in prior art, the RTK, RHK, and RLK are generated only at the instance of use for one tine use and then immediately permanently deleted after each use and thus have a transient property. By using complex key embodiments of RTK, RHK and RLK, as described above, based on wave random numbers and their random properties, it is believed, a stronger encryption is achieved within the existing science of cryptology.

BRIEF DESCRIPTION OF THE DRAWINGS

Some of the novel features of this invention will be best understood from the accompanying drawings, taken in conjunction with the accompanying description, in which similar reference characters refer to similar parts, and in which.

DESCRIPTION

Introduction

Figure 1:
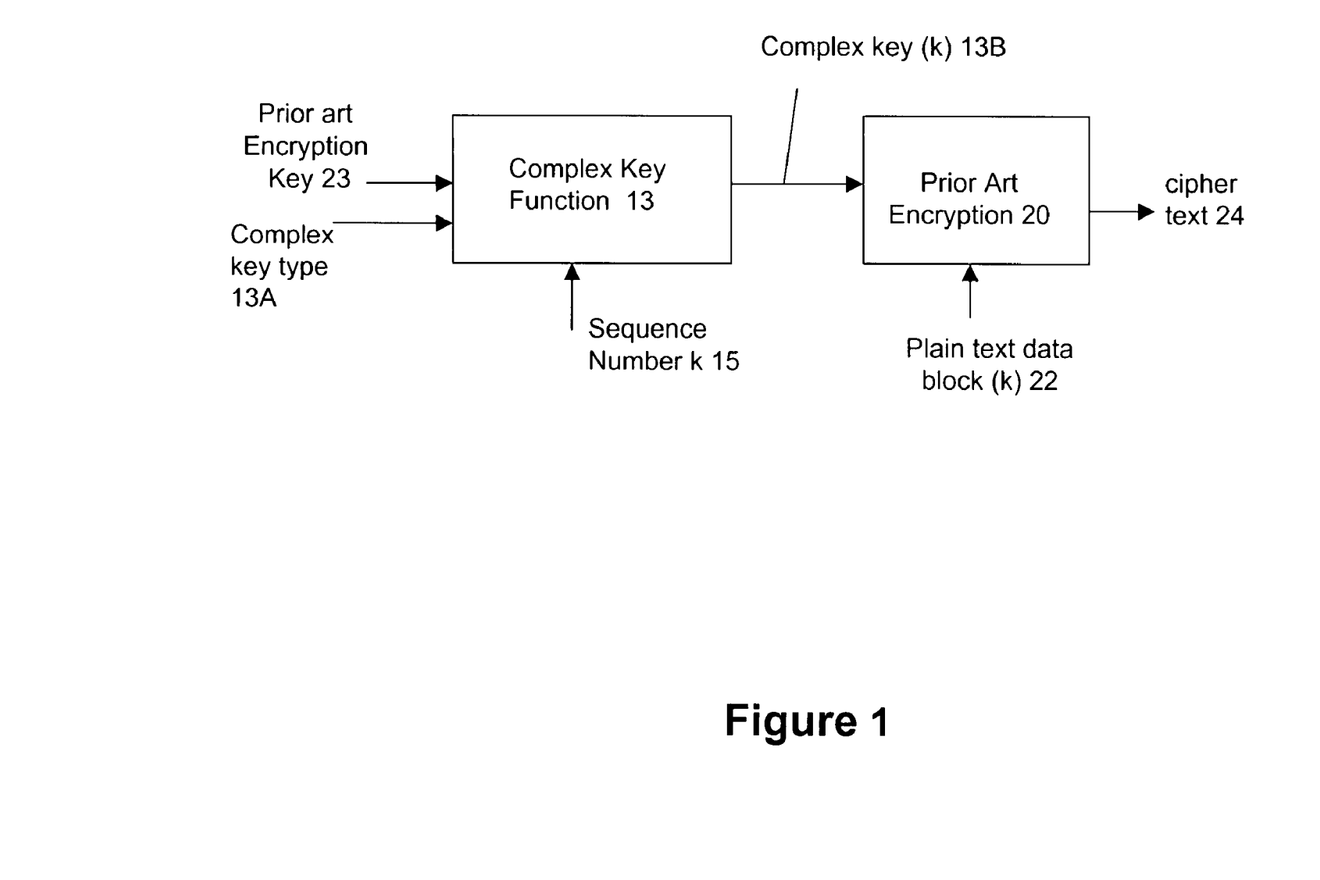
FIG. 1 is a block diagram that illustrates features of the present invention of complex encryption keys.

With reference to FIG. 1, a complex key function 13, using a prior art key 23 as input and a complex key type 13A and a sequence number k 15, outputs a complex key 13B at instance k. The complex key at instance k is input to a prior art encryption function 20 and a plain text data block 22 at instance k is output as the cipher text 24. The complex key type 13A represents a parameter defining one of the different types of complex keys as described herein.

Figure 6:
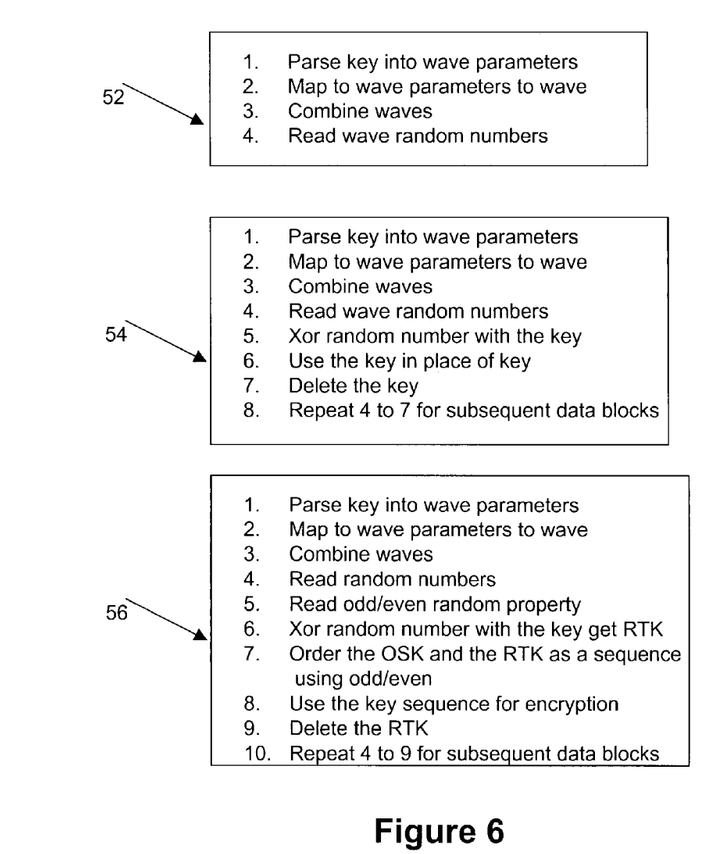
FIG. 6 is a method diagram that illustrates features of the present invention of using wave random numbers for complex encryption keys.
Figure 7:
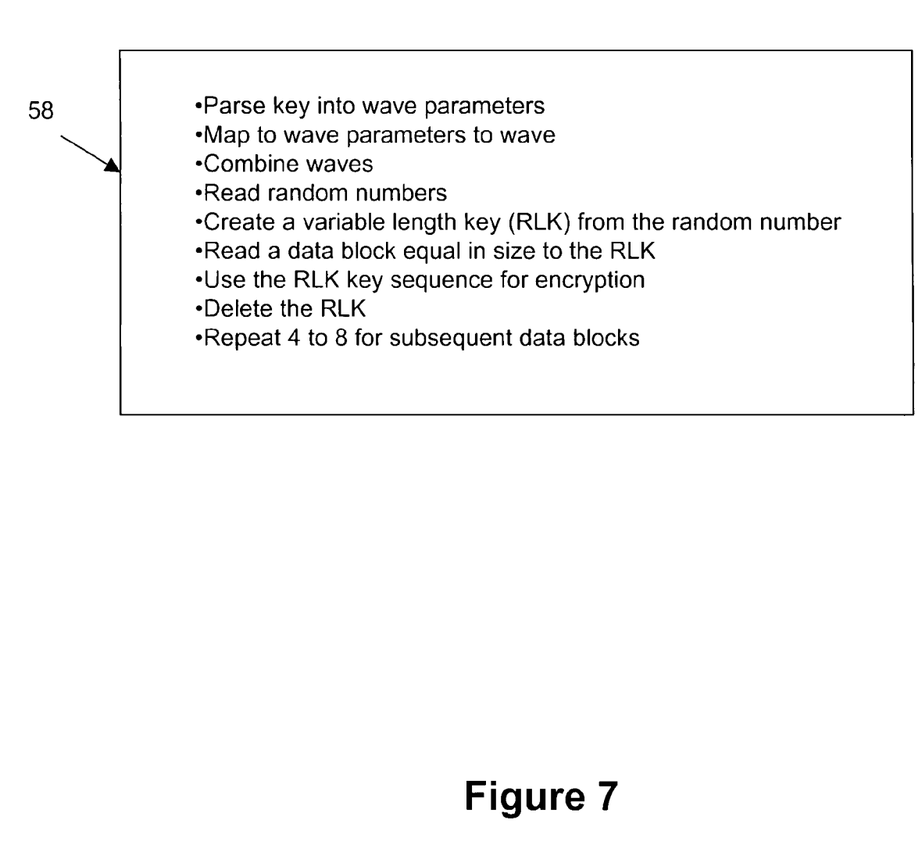
FIG. 7 is a method diagram that illustrates features of the present invention of using wave random numbers for complex encryption keys.

Different embodiments of creating and using complex encryption keys are described with reference to FIGS. 2 to 7. One complex key embodiment is called, random transient key (RTK) 18 is described with reference to FIGS. 2 and 3. Another embodiment is a stronger version of the RTK and is called random helical key (RHK) 44 and is described with reference to FIG. 4. The third complex key embodiment is described with reference to FIG. 5, and is called random length key (RLK) 46. These embodiments of complex encryption keys are random variants of the prior art key 23 and are derived from the prior art key itself, using a scheme of wave random numbers (WRN). FIGS. 6 and 7 are used to describe the related method steps for these embodiments of the complex encryption keys.

The WRN random numbers have random properties that are derived from the envelope of a complex wave. The wave envelope itself is created using an additive combination of different types of waves, each characterized by a time period, an amplitude, a phase, and a wave shape.

These parameters of the wave, (i) wave type or shape, (ii) wave period, (iii) wave amplitude and (iv) wave phase, are derived from the prior art encryption key 23 itself. Thus the complex wave that is derived from the prior art key itself is self sufficient as it is based on what is part of the prior art encryption schemes, that is an encryption key.

As a simplified illustration of the derivation of a complex wave from the prior art key, if the key length is 128 bits long, the key is parsed into a set of parameters or numbers. At least three sets are preferred as there can be more than three. Each set has up to four numbers. Of these four numbers, (i) one number may be 8 bits long and has a number that represents phase of a wave, (ii) another number may be a two bit number, that represents a wave type, (iii) another number is a 16 bit number that may represent the period of the wave and, (iv) a fourth number may also be 16 bit number that may represent the maximum amplitude.

The wave type may be from a sinusoid function, a pulse function and a saw tooth ramp function. Other wave forms may be used that are a combination of these basic wave shapes. The 8 bit number would provide for 256 gradations of 360 degrees. 2 bit wave shape would define a wave shape from sine, cosine, triangle and pulse shapes.

That makes up 42 bits that would define a wave with four different wave properties of shape, phase, period and amplitude. Three such waves would be parsed from the 126 bits of the 128 bit key, leaving 2 bits for spare for later possible use. Alternatively, four waves may be parsed from four 32 bit numbers from the 128 bit key length. The 32 bit number may be split in four numbers as above, yielding smaller number ranges of phase, amplitude and time period. This approach may be adapted for any length of the prior art key, where the key may be parsed into any number of sets, each set used to select and define a wave.

These are simplified illustrations. The original key length may be any length; two or more key lengths may be concatenated to yield larger numbers that would represent the wave parameters for more of the waves. For example, concatenating three 128 bit keys, would give a 378 bit long number from which to parse the wave parameters. There may be any number of sets of numbers that are parsed from the key itself, the length of each part in the set of numbers may be longer or shorter. The length of the numbers that represent the amplitude and time period may be different, and not equal as illustrated.

While the complex wave, as derived from the prior art encryption key, yields a new class of random numbers, called wave random numbers (WRN), these numbers can be exactly duplicated at a later instance in time and at a different location to yield the same set of random number sequences from the same prior art encryption key.

These random numbers (WRN) are used to derive a random transient key, RTK, from the original key or the prior art key, for each block of data and this transient randomly derived one time use key, RTK, is used in place of the original key, and the transient key is then instantly discarded.

In another embodiment of an even stronger key, yet another way to use a random variant key is described. Where, the original key and the random transient key, RTK are used in a random overlay helical pattern. These are called random helical keys (RHK). That is a set of two keys ordered randomly, where one is the RTK and the other is the prior art key. Alternatively, the overlay may be tandem, where these two keys are concatenated in a random order to yield a key of twice the length of the prior art key. That is the twice length key is a random order of the prior art key plus RTK and RTK plus prior art key.

In another embodiment of complex key, the key length itself is randomly varied. This embodiment of complex encryption key is called, random length key (RLK). As a simplified illustration, the wave random number is bounded between two ends that may represent the two bounds of the length of the encryption key and is itself used as the encryption key in place of the prior art key of fixed length. The key length variations may be bounded to a number that is a power of number two.

The benefit of variable length key is that the length of key varies randomly, in addition to the key itself varying randomly from each block to each data block in a random manner. Thus making it difficult in determining what the data boundaries are for those who would attempt to break the key and decipher the cipher text.

Having these approaches of generating and using RTK, RHK, and RLK with the prior art encryption algorithm, in place of the original or prior art keys makes the encryption stronger. Nothing needs to be stored and safeguarded except the original prior art keys. And the RTK or the RHK or the RLK that is actually used is un-deterministic by any known method, even though the RTK, RHK and RLK have been derived from the original key and the wave random numbers, which are generated from the original key itself.

Random Transient Key (RTK) 18

Figure 2:
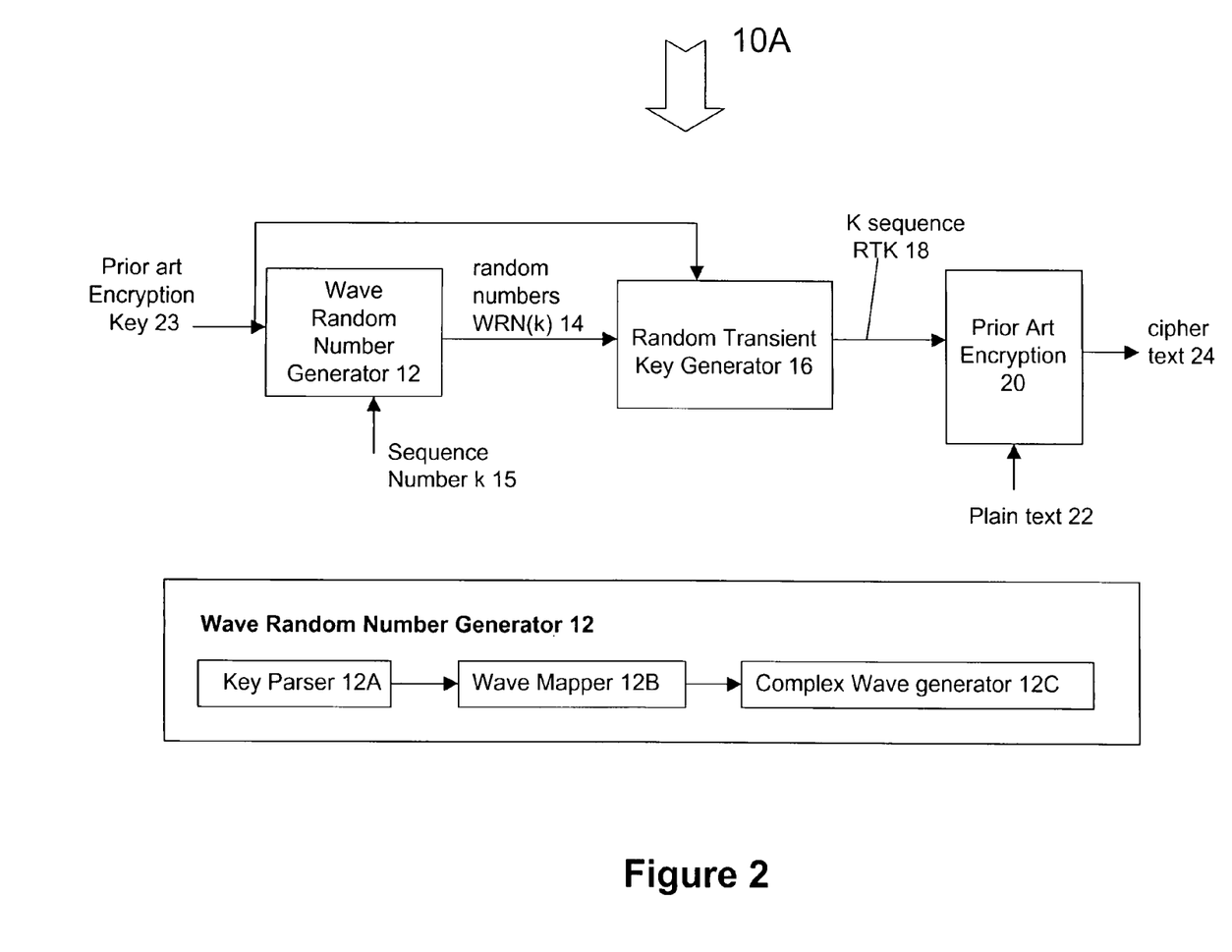
FIG. 2 is a block diagram that illustrates features of the present invention of how wave random numbers are used in creating complex encryption keys.

With reference to FIG. 2, a system of strong key, 10A, has a wave random number generator function 12, that using a prior art encryption key 23, and when input a sequence number k 15, generates a WRN(k) 14, a wave random number at instance k. This WRN 14 is input to a random transient key generator function 16, along with prior art key 23, to yield a random transient key (RTK) 18 at instance k. The function 16 may use any number of approaches to generate the RTK 18. However, the simple method of XOR'ing the wave random number and the original prior art key 23 is preferred.

This RTK 18 at instance k is used in prior art encryption 20, in place of prior art key 23, to transform a block k of the plain text 22 to cipher text 24. The RTK at instance k is then permanently discarded. The process is repeated for subsequent data blocks in time or sequence k+1. The process may be reversed to yield the plain text 22 from the cipher text 24.

The wave random number generator function 12 is made up of three sub-functions, a key parser 12A, a wave mapper 12B and a complex wave generator 12C.

Figure 3:
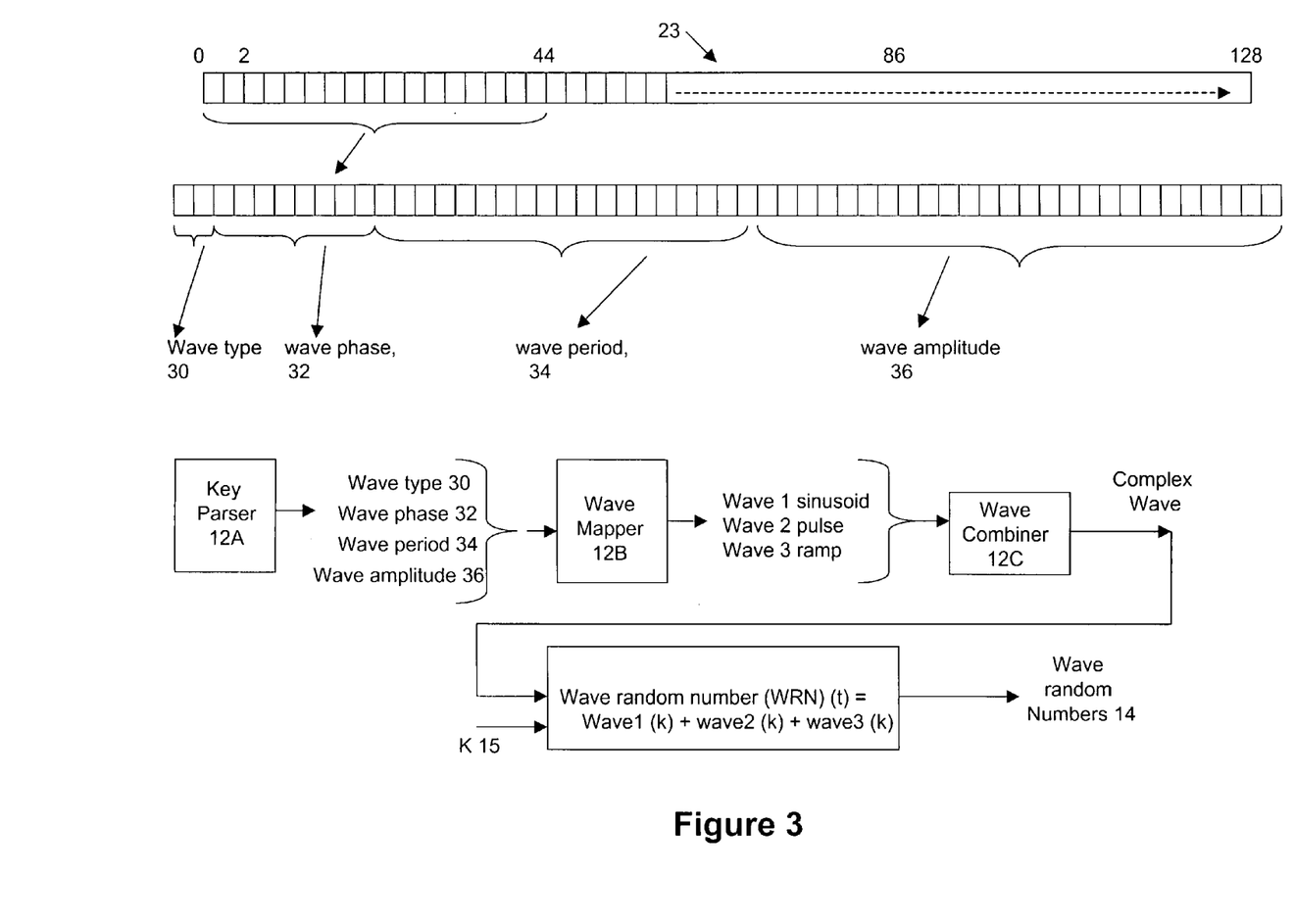
FIG. 3 is a block diagram that illustrates features of the present invention of parsing an encryption key for generating wave random numbers.

These sub-functions are further illustrated with the help of FIG. 3. Key Parser 12A parses the prior art key 23 of length 128 bits, into a set of numbers that may be used to represent, a wave type 30, a wave phase 32, a wave period 34 and a wave amplitude 36.

The wave mapper function 12B maps these three sets of numbers into wave 1 that is sinusoid, wave 2 that is pulse and a wave 3 that is a triangular shape. A wave combiner function 12C additively combines these waves into a complex wave. The complex wave, when is input time sequence k 15, yields a wave random number 14, at sequence k 15.

The logic that is used in the wave number generator function 12 in generating wave random numbers (WRN) 14, that is, key parser function logic 12A, wave mapper function logic 12B and the wave combiner function logic 12C, may be fixed or they may be parameterized.

The parameters may decide how the prior art key 23 is parsed by key parser function 12A, how the set of set of parameters are mapped to different type of waves by the wave mapper function 12B. There may be any number of ways the parsing may be done and any number of ways, the set of numbers may be mapped to the waves. These variations may be captured by parameters. These parameters may be exchanged between the two ends of transmission by using prior art protocols that are used to exchange and negotiate parameters.

Random Helical Key (RHK) 44

Figure 4:
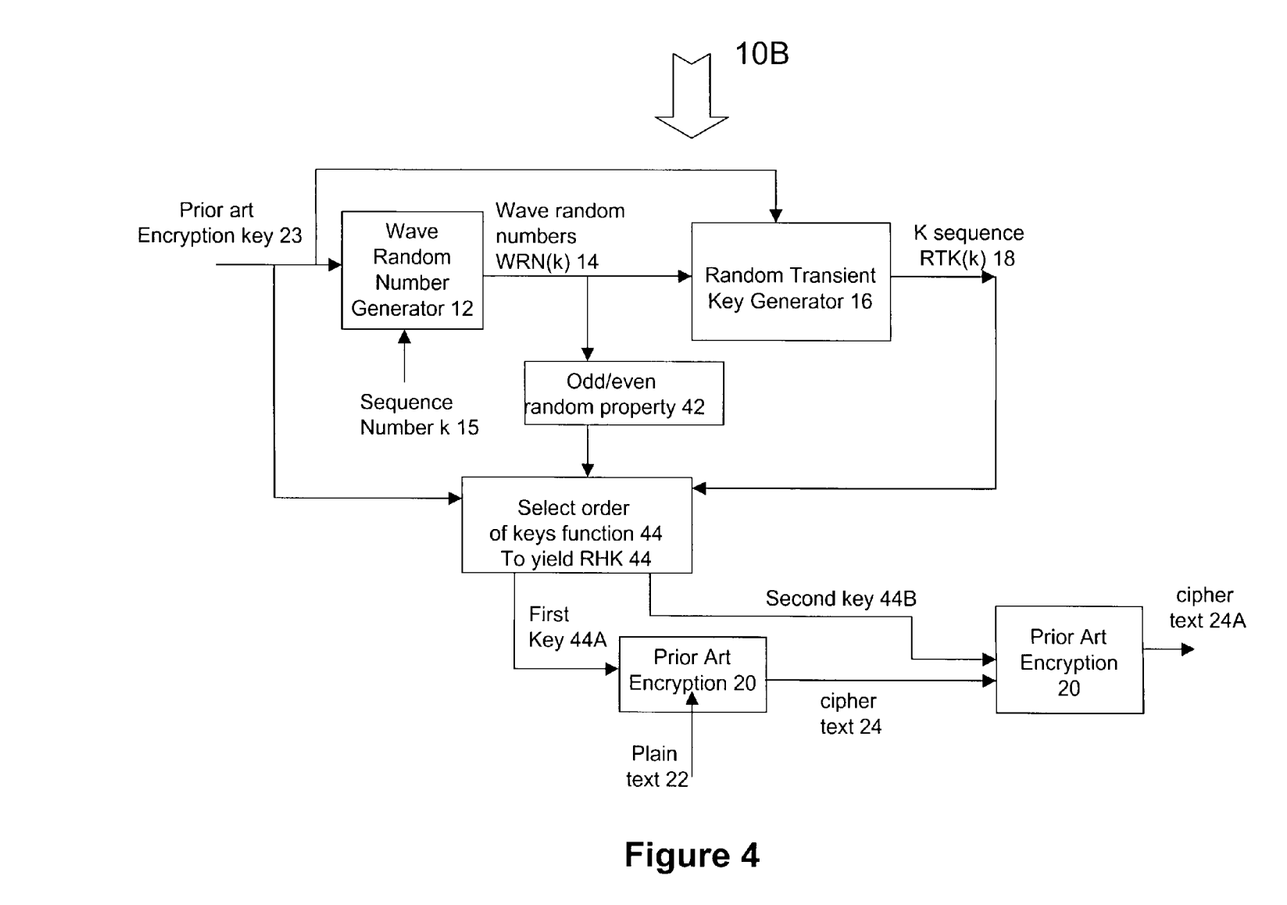
FIG. 4 is a block diagram that illustrates features of the present invention of using complex encryption keys that use random helical overlay of keys.

As illustrated in FIG. 4, another embodiment, a system of even stronger keys 10B, has a wave random number generator function 12, that using a prior art encryption key 23, and when input a sequence number k 15, generates a WRN(k) 14, a wave random number at instance k. This WRN 14 is input to a random transient key generator function 16, along with prior art key 23, to yield a random transient key (RTK) 18 at instance k.

An odd/even random function takes in the WRN(k) 14 and derives an odd even property of the WRN 14, and using this property selects either the prior art key 23 or the RTK 18 as the first key 44A and the other of these as the second key 44B.

The first key 44A is then used in a prior art encryption function 20 to encrypt the plain text 22 into cipher text 24. Then the second key 44B and the cipher text 24 are input to the prior art encryption 20 to yield cipher text 24A. The random layered combination of first key 44A and the second key 44B is called the random helical key 44.

The set of first key 44A and second key 44B is called a helical key. This RHK at instance k is used in prior art encryption 20, in place of prior art key 23, to transform a block k of the plain text 22 to cipher text 24A.

The cipher text 24A is what is transmitted or stored as protected data. The RTK and WRN at instance k are then permanently discarded. The process may be repeated for subsequent data blocks in time or sequence k+1. The process may be reversed to yield the plain text 22 from the cipher text 24A.

Random Length Key (RLK) 46

Figure 5:
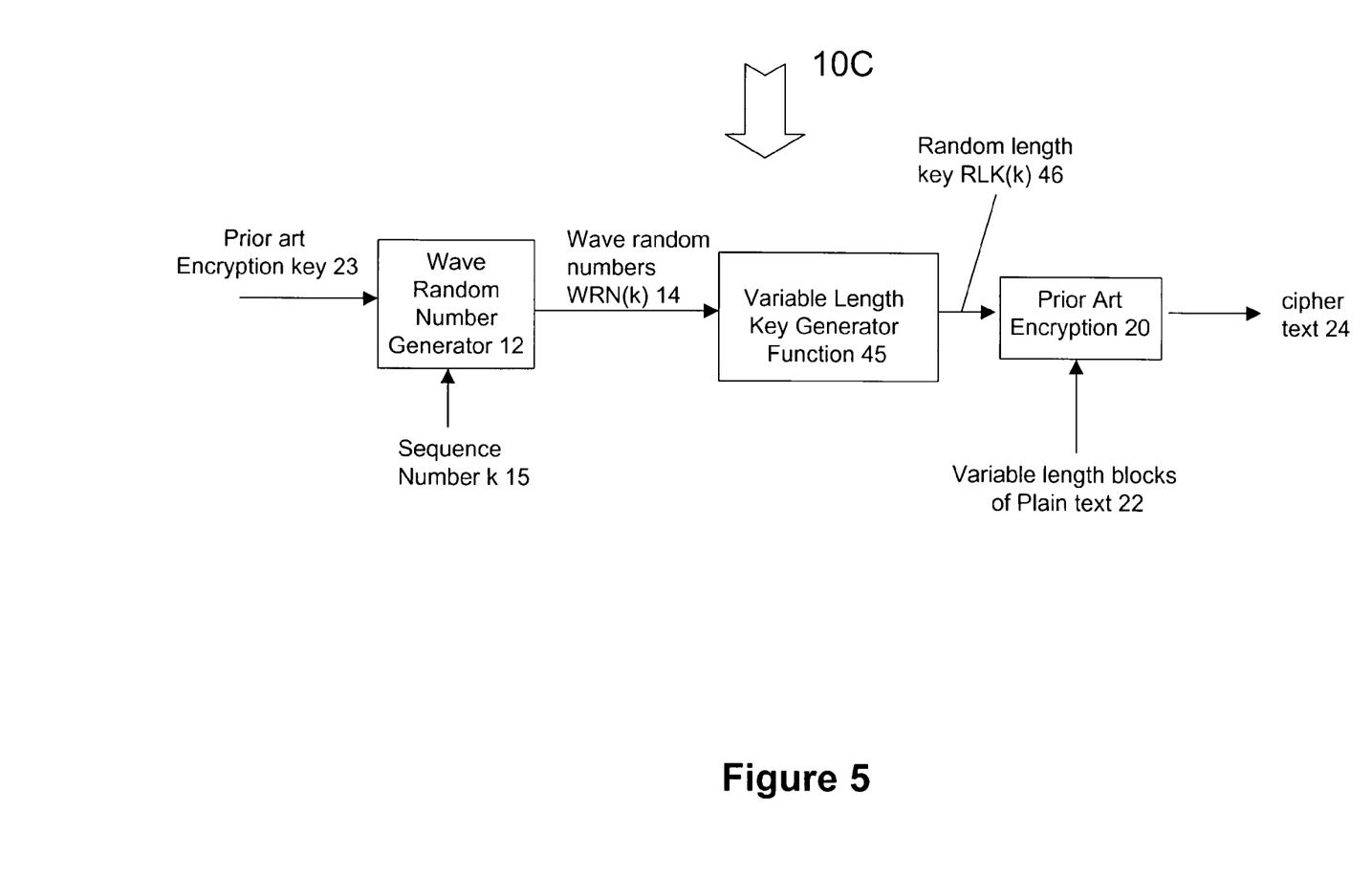
FIG. 5 is a block diagram that illustrates features of the present invention of using complex key of variable length.

As illustrated in FIG. 5, another embodiment, a system of complex keys 10C, has a wave random number generator function 12, that using a prior art encryption key 23, and when input a sequence number k 15, generates a WRN(k) 14, a wave random number at instance k. This WRN 14 is input to a Variable Length Key Generator Function 45 to yield a random length key (RLK) 46 at instance k.

The variable length key generator function 45 uses the wave random number 14 to create a random length key 46. The WRN 14 is a number that is randomly different at instances of k sequence and may be large or a small number depending upon the complex wave amplitude at instance k. The function 45 bounds the wave random number to represent random key lengths that are sized to be the power of number 2 to match the prior art encryption schemes. A lower and an upper limit may be placed on the bit length of the random length key. As a simplified illustration, the random key length may be limited to be between 64 and 256 bit long. Thus the function 45 transforms the wave random numbers 14 and the size of the wave random number 14 into a random length keys that are bounded in length by an upper and a lower bound.

The random length key RLK 46 is used to encrypt the corresponding length plain text data block 22 via prior art encryption function 20 to encrypt the plain text 22 into cipher text 24. The length of the plain text 22 data block is selected to match the length of the random length key 46 for instance k of the data block and the random length key 46.

The cipher text 24 is what is transmitted or stored as protected data. The RLK 46 and WRN 14 at instance k are then permanently discarded. The process may be repeated for subsequent data blocks in time or sequence k+1. The process may be reversed to yield the plain text 22 from the cipher text 24.

Any number of approaches of using the WRN 14 and the prior art key 23 may be used to derive one time use, random, complex transient keys and are not ruled out.

Method Steps for RTK 18, RHK 44 and RLK 46

A method of using complex encryption keys, in an encryption scheme using an encryption algorithm and an n-bit length encryption key, comprising the steps of: (i) parsing the n-bit length key into a set of numbers, with at least three sets; (ii) mapping each set of numbers to numbers that represent a wave, such as, phase, period, amplitude and wave type; and (iii) combining the set of waves additively, yielding a complex wave.

The method comprising the further steps of: deriving a sequence of random numbers from the complex wave amplitude for use in creating one time use, transient n-bit length keys.

The method comprising the further steps of: xor'ing the sequence of random numbers with the original n-bit length key to generate a sequence of varying n-bit length encryption keys for use as encryption keys in place of the original n-bit length encryption key, thus yielding RTK encryption keys that vary randomly for use with the encryption algorithm.

The method comprising the steps of: deleting the varying encryption keys after each use and recreating varying keys at a different time and place for decryption by repeating the process steps.

The method comprising the steps of: selecting the waves from three basic wave types with properties of sinusoid, ramp and a pulse.

The method comprising the steps of: duplicating the parsing and mapping algorithm at each end of a wireless transmission where the stronger encryption key method is used for encrypting and decrypting wireless transmissions.

The method comprising the steps of: saving the parsing and mapping algorithm for later use for data decryption where the stronger encryption key method is used for encrypting data in storage.

The method comprising the steps of: (i) reading from the sequence of random numbers, an odd/even property; (ii) using the odd/even property in selecting one of the encryption keys, from the set of encryption keys of the n-bit length RTK encryption key as an instance of varying encryption keys, as a first key and the other key as the second key.

The method comprising the steps of: encrypting by using the first encryption key and then encrypting again by using the second encryption key, thereby using a set of layer encryption using the first and second key in sequence, thus yielding a stronger encryption key.

The method comprising the steps of: encrypting a variable length data block by using a variable length key RLK 46, where the RLK 46 is generated by a variable length key function 45.

The method steps may be further illustrated with FIGS. 6 and 7, as step group 52, step group 54, step group 56, and step group 58.

The step group 52 for wave random numbers 14 is:
1. Parse key into wave parameters
2. Map to wave parameters to wave
3. Combine waves
4. Read wave random numbers The step group 54 for RTK 18 is:
1. Parse key into wave parameters
2. Map to wave parameters to wave
3. Combine waves
4. Read wave random numbers
5. Xor random number with the key
6. Use the key in place of key
7. Delete the key
8. Repeat 4 to 7 for subsequent data blocks.

The step group 56 for RHK 44 is:
1. Parse key into wave parameters
2. Map to wave parameters to wave
3. Combine waves
4. Read random numbers
5. Read odd/even random property
6. Xor random number with the key get RTK
7. Order the OSK and the RTK as a sequence using odd/even
8. Use the key sequence for encryption
9. Delete the RTK
10. Repeat 4 to 9 for subsequent data blocks The step group 58 for RLK 46 is:
1. Parse key into wave parameters
2. Map to wave parameters to wave
3. Combine waves
4. Read random numbers 5. Create a variable length key (RLK) from the random number
6. Read a data block equal in size to the RLK
7. Use the RLK key sequence for encryption
8. Delete the RLK
9. Repeat 4 to 8 for subsequent data blocks The embodiments related to complex encryption keys RTK 18, RHK 44 and RLK 46 are intended to work with the existing cryptology science, as described below.

Have present at two ends of transmission, a plurality of encryption algorithms, and a set of encryption keys. Using a prior art protocol, parameters are exchanged without encryption that negotiate which algorithms are present at the two ends and one of them is selected, for this session. Then parameters are exchanged and negotiated where one of the encryption keys from the set of pre-stored keys is selected for use.

Then this algorithm and the key are used for encrypting the data being exchanged between the two ends of the transmission. Then a set of parameters is exchanged that define how the WRN would be generated from the selected encryption key. The set of parameters are used to create a complex wave at the transmitting end.

The wave random numbers are then created one at a time from the complex wave. These are used to generate a transient one time use RTK(k) for use in block k of data. The RTK(k) is used for encryption in place of prior art key and then deleted.

As an alternate, the WRN is used to create a random transient key, RTK and then the odd/even property of the WRN is used to create a set of two overlay keys, one of which is the RTK and the other is the prior art key. This set of layered leys called random helical keys (RHK) are then used in place of the prior art key and then the RTK is deleted.

As another alternate, the WRN is used to create a random length key, RLK that is used in place of the prior art key and then the RLK is deleted.

At the receiving end, the set of parameters are used to create the same complex wave. The same wave random numbers are created one at a time, are then used to generate the same RTKn for decrypt of the n encrypted data block.

The sending and receiving ends both maintain the sequence number k for data blocks to be able to coordinate that the same WRN is used for generating the complex key that is used for encryption and decryption. Same process is repeated for when the receiving end is the transmission end. Both the ends keep track of the order of the data blocks by keeping a received data block n, to make sure the same WRN is used for generating the complex key for encryption and decryption at both the ends. Protocol is used to reinitialize the n and k to coordinate the use of WRNs and thus the complex keys in both directions.

In summary, the preferred embodiment of the complex keys of random transient key (RTK) 18, the random helical key (RHK) 44 and random length key (RLK) 46 may be used for encryption and decryption for transmission security and for data storage security in place of the prior art encryption keys. The RTK, RHK and RLK are stronger encryption keys than the prior art key, having been derived from the prior art key at the instance of use using wave random number properties.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A method of generating complex encryption keys, implemented in a digital machine with an encryption algorithm and an n-bit length encryption key, comprising the steps of:
   a. parsing the n-bit length key into multiple sets of numbers;
   b. mapping each set of numbers to a wave, yielding a set of waves;
   c. combining the set of waves additively yielding a complex wave;
   d. deriving a sequence of random numbers and a sequence of random properties from the complex wave;
   e. generating a sequence of complex encryption keys in the digital machine using these sequences of random numbers and random properties.

2. The method as in claim 1, comprising the steps of:
   mathematically operating the sequence of random numbers with the n-bit length key, thus creating a sequence of transient, one time use, n-bit length keys and using the sequence of random properties with each key of the sequence of transient keys creating a sequence of complex encryption keys.

3. The method as in claim 1, comprising the steps of:
   identifying a wave by the set of numbers mapped to attributes of that particular wave, the attributes comprising, phase, period, amplitude and wave type.

4. The method as in claim 1, comprising the steps of:
   parsing the n-bit length encryption key into at least three sets of numbers, where each set is mapped to a sinusoidal, a ramp or a pulse shape waveform.

5. The method as in claim 1, comprising the steps of:
   xoring the sequence of random numbers with the n-length key to generate a sequence of encryption keys in place of the n-length encryption key, thus yielding a sequence of encryption keys that vary randomly for use with the encryption algorithm;
   using the sequence of random properties, randomly selecting a sequence of keys from the n-length key and the sequence of encryption keys, creating a sequence of complex encryption keys.

6. The method as in claim 1, comprising the steps of:
   deleting a generated complex encryption key after each use and recreating the complex encryption key at a different time and place for decryption by repeating the process steps (a) to (e).

7. The method as in claim 1, comprising the steps of:
   selecting the waves from wave types with properties of sinusoid, ramp and a pulse.

8. The method as in claim 1, comprising the steps of:
   duplicating the parsing and mapping steps at each end of a wireless transmission where the complex encryption key method is used in encrypting and decrypting wireless transmissions.

9. The method as in claim 1, comprising the steps of:
   saving the parsing and mapping steps for later use for data decryption where the complex encryption key method is used in encrypting data in storage.

10. The method as in claim 1, comprising the steps of:
    a. reading from the sequence of random numbers, a sequence of odd/even property;
    b. using the sequence of odd/even property in selecting one of the encryption keys, from a set of encryption keys, the set includes, the n-length encryption key and an instance of the complex encryption keys, as a first key and the other key as a second key;

c. encrypting a data block by using the first encryption key and then encrypting again by using the second encryption key, thereby using the first and the second key in a random order, thus yielding a stronger complex encryption key.

11. The method as in claim 1, comprising the steps of:
using the sequence of random numbers for generating variable length keys, each key length is a power of 2 and is bounded between a lower and an upper key length.

12. A system operable in a digital machine for generating complex encryption keys, using an encryption algorithm and an n-bit length encryption key, comprising:
the digital machine programmed to execute,
  a. a function that parses the n-bit length key into multiple sets of numbers;
  b. a function that maps each set of numbers to a wave that yields a set of waves;
  c. a function that combines the set of waves additively yielding a complex wave;
  d. a function that derives a sequence of random numbers and a sequence of random properties from the complex wave; and
  e. a function that generates a sequence of complex encryption keys in the digital machine using these sequences of random numbers and random properties.

13. The system as in claim 12, comprising:
a function that creates a sequence of transient n-length keys by mathematically operating the sequence of random numbers and using the sequence of random properties with the n-bit length encryption key.

14. The system as in claim 12, comprising:
a function that parses the n-bit length key into at least three sets of numbers, where each set is mapped to a sinusoidal, a ramp or a pulse shape waveform
and where each wave is identified by the set of numbers mapped to properties of that particular wave, the properties comprising, phase, period, amplitude and wave type.

15. The system as in claim 12, comprising:
a function that xor'es the sequence of random numbers with the n-length key to generate a sequence of varying encryption keys for use as encryption keys in place of the n-length encryption key, thus yielding encryption keys that vary randomly for use with the encryption algorithm;
a function that uses the sequence of random properties, randomly selects a sequence of keys from the n-length key and the sequence of encryption keys, thus creates a sequence of complex encryption keys.

16. The system as in claim 12, comprising:
a function that deletes generated complex encryption keys after each use and recreates the complex encryption keys at a different time and place for decryption by repeating the process steps (a) to (e).

17. The system as in claim 12, comprising:
a function that generates, using the sequence of random numbers a sequence of variable length keys, where each variable key length is a power of 2 and is bounded between a lower and an upper key length.

18. The system as in claim 12, comprising:
a function that duplicates the parsing and mapping algorithms at each end of a wireless transmission where the complex encryption key system is used in encrypting and decrypting wireless transmissions.

19. The system as in claim 12, comprising:
a function that saves the parsing and mapping algorithms for later use for data decryption where the stronger encryption key system is used in encrypting data in storage.

20. The system as in claim 12, comprising:
  a. a function that derives from the sequence of random numbers, a sequence of odd/even property;
  b. the sequence of the odd/even property is used in selecting one of the encryption keys, from a set of encryption keys, the set includes, the n-length encryption key and an instance of the complex encryption keys, as a first key and the other key as a second key;
  c. a data block is encrypted by using the first encryption key and then encrypting again by using the second encryption key, thereby using the first and the second key in a random order, thus yielding a stronger complex encryption key.

* * * * *